United States Patent [19]

Taylor

[11] Patent Number: 5,178,701
[45] Date of Patent: Jan. 12, 1993

[54] CHEMICAL SEALANT DEVICE FOR REPAIRING FLAT TIRES

[76] Inventor: Jorge Taylor, 104 Alcolade Dr. East, Shirley, N.Y. 11967

[21] Appl. No.: 710,752

[22] Filed: May 31, 1991

[51] Int. Cl.$^5$ .................... B29C 73/22; B60C 17/00
[52] U.S. Cl. .................... 152/509; 152/418; 152/516
[58] Field of Search ............ 152/502, 503, 504, 505, 152/506, 507, 509, 337.1, 338.1, 341.1, 342.1, 418, 516, 518, 519, 520

[56] References Cited

U.S. PATENT DOCUMENTS

| | | | |
|---|---|---|---|
| 3,511,294 | 5/1970 | Bepristis et al. | 152/418 |
| 3,941,843 | 1/1976 | Edwards et al. | 152/509 X |
| 4,263,953 | 4/1981 | Nicelli | 152/520 X |

FOREIGN PATENT DOCUMENTS 2651520 5/1978 Fed. Rep. of Germany .
0015204 2/1979 Japan .

Primary Examiner—Michael W. Ball
Assistant Examiner—Francis J. Lorin
Attorney, Agent, or Firm—Richard L. Miller

[57] ABSTRACT

A chemical sealant device is provided for repairing a flat tire of a wheel, which consists of a rim for supporting and fitting a tire thereabout. A first mechanism is on the interior of the rim for carrying a portion of the load of the wheel after the tire is punctured and becomes partially flat. A second mechanism is within the first carrying mechanism for releasing at predetermined intervals of rotation of the wheel, tire chemical sealant and compressed air into the tire so that eventually the tire will be repaired and tire pressure will be at least partially restored, whereby road damage to the tire will be prevented.

4 Claims, 2 Drawing Sheets

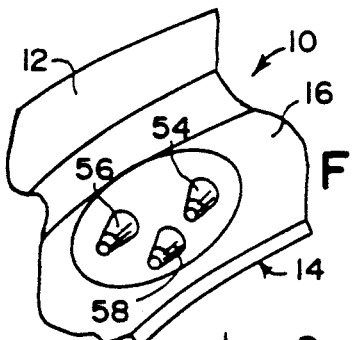
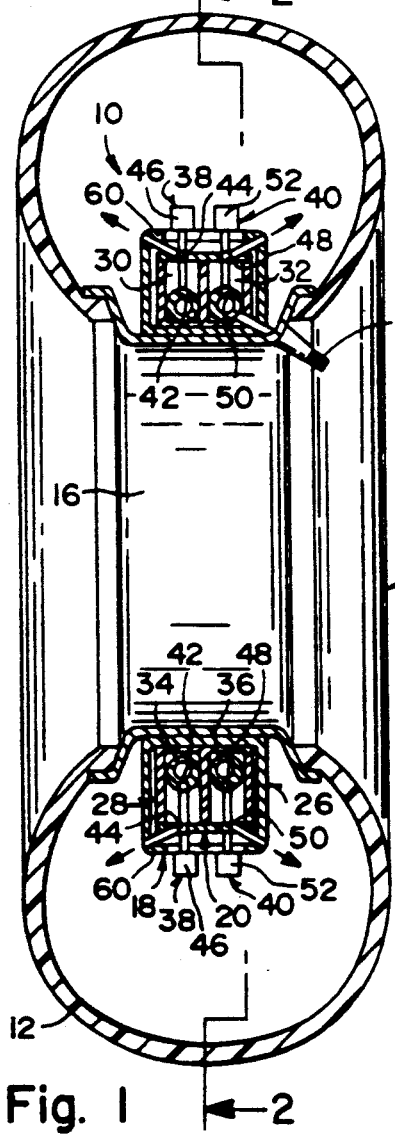
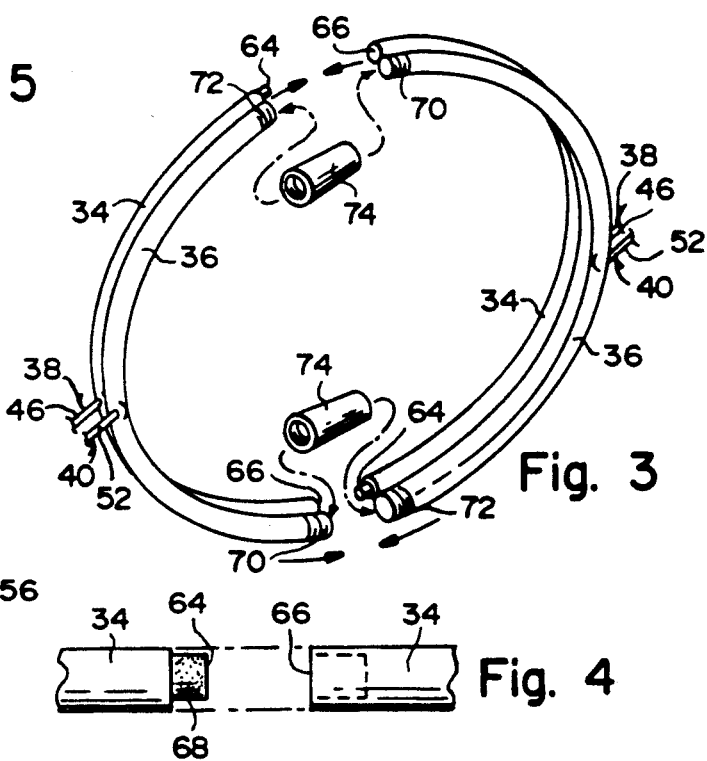
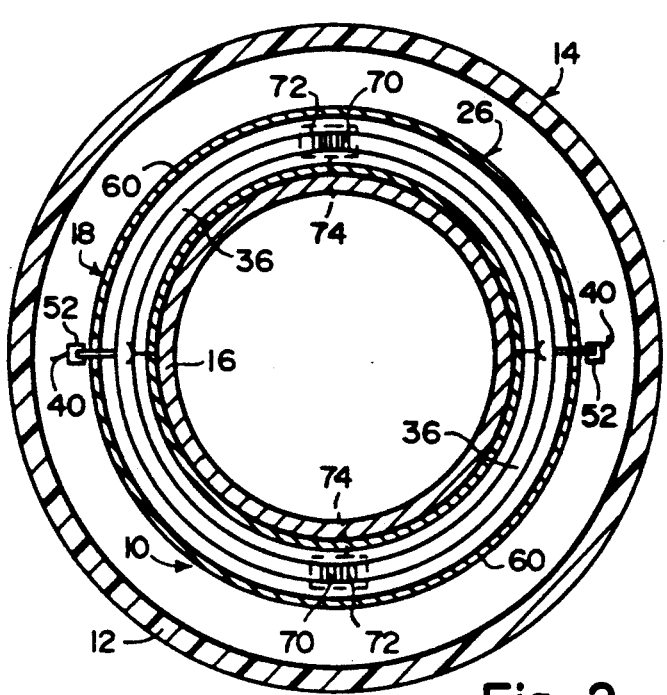

CHEMICAL SEALANT DEVICE FOR REPAIRING FLAT TIRES

BACKGROUND OF THE INVENTION

The instant invention relates generally to tire repair and more specifically it relates to a chemical sealant device for repairing a flat tire automatically while the tire remains in use on the vehicle.

Numerous tire repair kits have been provided in the prior art that are adapted to remove the tire from the rim and plug up punctures in the tire. For example, U.S. Pat. Nos. 3,963,417 to Placek; 4,317,692 to Niconchuk and 4,710,249 to Roberts all are illustrative of such prior art. While these units may be suitable for the particular purpose to which they address, they would not be as suitable for the purpose of the present invention as hereafter described.

SUMMARY OF THE INVENTION

A primary object of the present invention is to provide a chemical sealant device for repairing a flat tire that will overcome the shortcomings of the prior art devices.

Another object is to provide a chemical sealant device for repairing a flat tire that includes a valve system built into the tire wheel rim to release at predetermined intervals of rotation the chemical sealant and compressed air when the tire is punctured, thereby preventing a road hazard accident.

An additional object is to provide a chemical sealant device for repairing a flat tire that does away with the fastidious time consuming task of fixing the flat before being able to safely drive.

A further object is to provide a chemical sealant device for repairing a flat tire that is simple and easy to use.

A still further object is to provide a chemical sealant device for repairing a flat tire that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a diagrammatic cross sectional view of a wheel with parts broken away with the instant invention installed therein;

FIG. 2 is another diagrammatic cross sectional view taken on line 2—2 of FIG. 1;

FIG. 3 is a diagrammatic perspective view of the chemical and air vessels of the instant invention;

FIG. 4 is a diagrammatic elevational view showing the securement mechanism for the tire chemical sealant vessel;

FIG. 5 is a perspective view with parts broken away of the fill inlets;

DETAILED DESCRIPTION OF THE PREFERRED EMBODIMENTS

Figure 6:
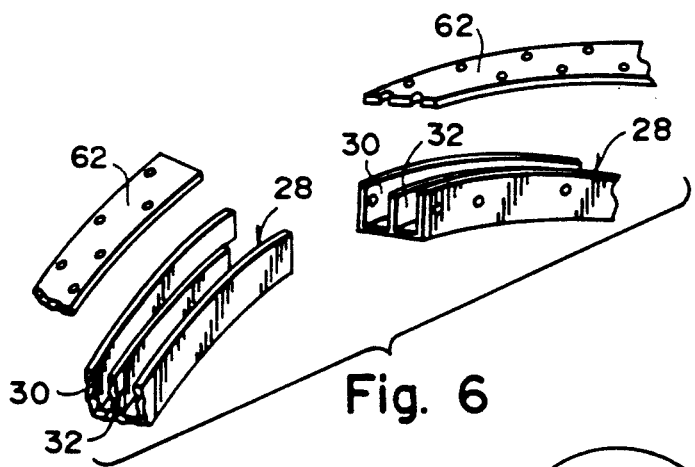
FIG. 6 is a diagrammatic perspective view with parts broken away of the inner torus member.
Figure 7:
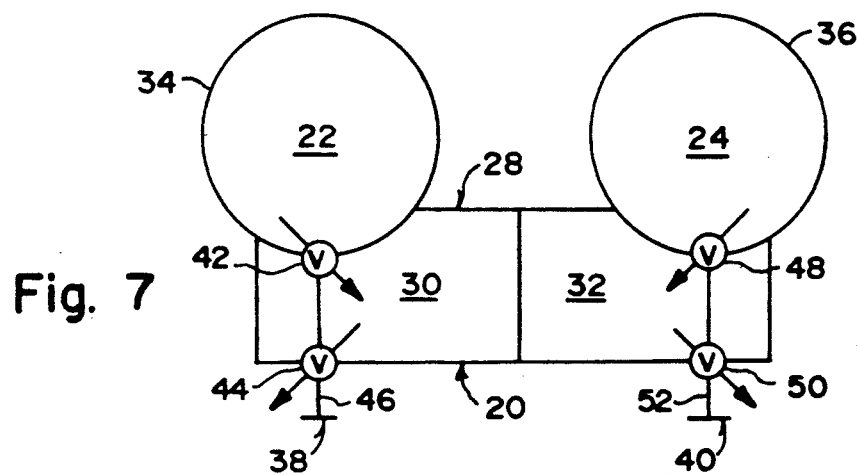
FIG. 7 is a diagrammatic representation of the valve system.

Turning now descriptively to the drawings, in which similar reference characters denote similar elements throughout the several views, the Figures illustrate a chemical sealant device 10 for repairing a flat tire 12 of a wheel 14, which consists of a rim 16 for supporting and fitting the tire 12 thereabout. A mechanism 18 is on the interior of the rim 16 for carrying a portion of the load of the wheel 14 after the tire 12 is punctured and becomes partially flat. Another mechanism 20 is within the carrying mechanism 18, for releasing at predetermined intervals of rotation of the wheel 14, tire chemical sealant 22 and compressed air 24 into the tire 12 so that eventually the tire 12 will be repaired and tire pressure will be at least partially restored, whereby road damage to the tire will be prevented.

The carrying mechanism 18 includes an outer hollow torus member 26 affixed onto the interior surface of the rim 16. The releasing mechanism 20 includes an inner hollow torus member 28 having dual side by side annular chambers 30 and 32, whereby the inner hollow torus member 28 is disposed within the outer hollow torus member 26. A first annular vessel 34 is placed into the first annular chamber 30 of the inner hollow torus member 28. The first annular vessel 34 holds the tire chemical sealant 22 therein. A second annular vessel 36 is placed into the second annular chamber 32 of the inner hollow torus member 28. The second annular vessel 36 holds the compressed air 24 therein. A first valve system 38 is connected to the first annular vessel 34, so that when the first valve system 38 is activated by the rotation of the wheel 14, it will release some of the tire chemical sealant 22 into the first annular chamber 30 of the inner hollow torus member 28. When the first valve system 38 is deactivated by the continued rotation of the wheel 14, it will release the tire chemical sealant 22 from the first annular chamber 30 of the inner hollow torus member 28 into the tire 12 to seal the puncture. A second valve system 40 is connected to the second annular vessel 36, so that when the second valve system 40 is activated by the rotation of the wheel 14, it will release some of the compressed air 24 into the second annular chamber 32 of the inner hollow torus member 28. When the second valve system 40 is deactivated by the continued rotation of the wheel 14, it will release the compressed air 24 from the second annular chamber 32 of the inner hollow torus member 28 into the tire 12 to inflate the tire 12.

The first valve system 38 includes a normally closed valve 42 between the first annular vessel 34 and the first annular chamber 30 of the inner hollow torus member 28. A normally opened valve 44 is between the first annular chamber 30 of the inner hollow torus member 28 and the interior of the tire 12. A valve stem 46 is connected to the normally closed valve 42 and the normally opened valve 44 and extends outwardly from the outer hollow torus member 26. When the wheel 14 rotates the valve stem 46 will be depressed and released at the predetermined intervals. The second valve system 40 includes a normally closed valve 48 between the second annular vessel 36 and the second annular chamber 32 of the inner hollow torus member 28. A normally opened valve 50 is between the second annular chamber 32 of the inner hollow torus member 28 and the interior of the tire 12. A valve stem 52 is connected to the normally closed valve 48 and the normally opened valve 50 and extends from the outer hollow torus member 26. When the wheel 14 rotates the valve stem 52 will be depressed and released at the predetermined intervals.

Figure 8:
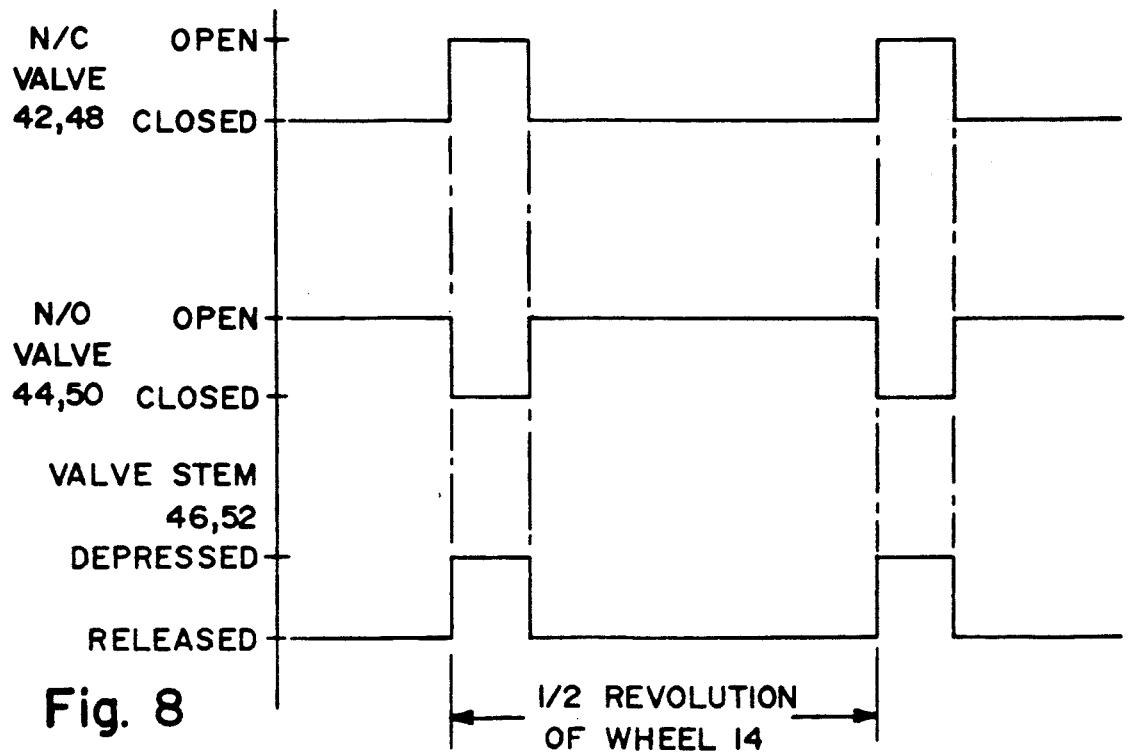
FIG. 8 is a timing diagram indicating the sequence of events in which material is released by the valve system.

FIG. 8 is a timing diagram indicating the sequence of events that occur during a half of rotation of the tire when it has become sufficiently flat as to cause the instant invention to become operative. It is to be observed that a short pulse duration occur when the valve systems and the tire in the vicinity of the valve systems is depressed by coming in to contact with the roads surface.

The chemical sealant device 10 further includes a first inlet valve 54 on the rim 16, connected to the first annular vessel 34 so that the first annular vessel 34 can be filled with the tire chemical sealant 22. A second inlet valve 56 on the rim 16, is connected to the second annular vessel 36 so that the second annular vessel 36 can be filled with the compressed air 24. A third inlet valve 58 on the rim 16 is connected to the tire 12 so that the tire 12 can be normally filled with air.

For assembly, the outer hollow torus member 26 is split into two parts and has cover plates 60, while the inner hollow torus member 28 is also split into two parts and has cover plates 62. The first annular vessel 34 and the second annular vessel 36 are also split into two parts. The first annular vessel 34 contains male plugs 64 and female sockets 66 so that adhesive 68 can be applied onto the plugs 64 to properly seal the two parts together. Each part of the second annular vessel 36 contains right handed threads 70 and left handed threads 72 at opposite ends so that each of the two connectors 74 and be threaded thereto to connect the two parts together.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A chemical sealant device for repairing a flat tire of a wheel, comprising:
   a) a rim for supporting and fitting a tire thereabout;
   b) carrying means on the interior of said rim for carrying a portion of the load of the wheel after the tire is punctured and becomes partially flat, wherein said carrying means includes an outer hollow torus member affixed onto the interior surface of said rim; and
   c) releasing means within said carrying means, for releasing at predetermined intervals of rotation of the wheel, tire chemical sealant and compressed air into the tire so that eventually the tire will be repaired and tire pressure will be at least partially restored, whereby road damage to the tire will be prevented wherein said releasing means includes:
      i) an inner hollow torus member having dual side by side annular chambers, whereby said inner hollow torus member is disposed within said outer hollow torus member;
      ii) a first annular vessel placed into the first annular chamber of said inner hollow torus member, said first annular vessel holds the tire chemical sealant therein;
      iii) a second annular vessel placed into the second annular chamber of said inner hollow torus member, said second annular vessel holds the compressed air therein;
      iv) a first valve system connected to said first annular vessel, so that when said first valve system is activated by the rotation of the wheel it will release some of the tire chemical sealant into the first annular chamber of said inner hollow torus member and when said first valve system is deactivated by the continued rotation of the wheel it will release the tire chemical sealant from the first annular chamber of said inner hollow torus member into the tire to seal the puncture; and
      v) a second valve system connected to said second annular vessel, so that when said second valve system is activated by the rotation of the wheel it will release some of the compressed air into the second annular chamber of said inner hollow torus member and when said second valve system is deactivated by the continued rotation of the wheel it will release the compressed air from the second annular chamber of said inner hollow torus member into the tire to at least partially restore tire pressure.

2. A chemical sealant device for repairing a flat tire of a wheel as recited in claim 1, wherein said first valve system includes:
   a) a normally closed valve between said first annular vessel and the first annular chamber of said inner hollow torus member;
   b) a normally opened valve between the first annular chamber of said inner hollow torus member and the interior of the tire; and
   c) a valve stem connected to said normally closed valve and said normally opened valve and extending outwardly from said outer hollow torus member so that when the wheel rotates said valve stem will be depressed and released at the predetermined intervals.

3. A chemical sealant device for repairing a flat tire of a wheel as recited in claim 2, wherein said second valve system includes:
   a) a normally closed valve between said second annular vessel and the second annular chamber of said inner hollow torus member;
   b) a normally opened valve between the second annular chamber of said inner hollow torus member and the interior of the tire; and
   c) a valve system connected to said normally closed valve and said normally opened valve and extending outwardly from said outer hollow torus member so that when the wheel rotates said valve stem will be depressed and released at the predetermined intervals.

4. A chemical sealant device for repairing a flat tire of a wheel as recited in claim 3, further including:
   a) a first inlet valve on the rim connected to said first annular vessel so that said first annular vessel can be filled with the tire chemical sealant;
   b) a second inlet valve on the rim connected to said second annular vessel so that said second annular vessel can be filled with the compressed air; and
   c) a third inlet valve on the rim connected to the tire so that the tire can be normally filled with air.

* * * * *